United States Patent
Basala

[19]

[11] Patent Number: 6,044,901
[45] Date of Patent: Apr. 4, 2000

[54] LIVE WELL TEMPERATURE MANAGEMENT APPARATUS

[76] Inventor: Donald C. Basala, 7155 E. County Rd. 150 S., Plainfield, Ind. 46168

[21] Appl. No.: 09/126,797

[22] Filed: Jul. 31, 1998

[51] Int. Cl.[7] .................................................. A01K 97/00
[52] U.S. Cl. ........................... 165/122; 165/41; 165/121; 43/55
[58] Field of Search ............................. 165/41, 121, 122, 165/132

[56] References Cited

U.S. PATENT DOCUMENTS

| | | |
|---|---|---|
| 2,151,225 | 3/1939 | Newton . |
| 3,635,285 | 1/1972 | Davis ......................................... 165/51 |
| 3,800,462 | 4/1974 | Coyle . |
| 3,860,064 | 1/1975 | Murphy .................................... 165/121 |
| 4,033,280 | 7/1977 | Wood et al. . |
| 4,074,651 | 2/1978 | Arduser . |
| 4,151,810 | 5/1979 | Wiggins . |
| 4,275,522 | 6/1981 | Glover . |
| 4,327,398 | 4/1982 | Christison ........................... 165/122 X |
| 4,685,513 | 8/1987 | Longhouse et al. .................... 165/121 |
| 4,708,084 | 11/1987 | Campau . |
| 4,748,765 | 6/1988 | Martin ......................................... 43/55 |
| 4,815,411 | 3/1989 | Burgess . |
| 4,867,102 | 9/1989 | Turano . |
| 4,945,672 | 8/1990 | Raia . |
| 4,970,982 | 11/1990 | Martin . |
| 5,010,681 | 4/1991 | Cox, Jr. ......................................... 43/57 |
| 5,010,836 | 4/1991 | Riviezzo . |
| 5,236,175 | 8/1993 | Campau . |
| 5,299,424 | 4/1994 | Woodson et al. . |
| 5,365,750 | 11/1994 | Greenthal . |
| 5,490,481 | 2/1996 | Strong . |
| 5,640,799 | 6/1997 | Taube et al. . |
| 5,671,803 | 9/1997 | Tepas et al. ............................... 165/41 |

*Primary Examiner*—Allen Flanigan
*Attorney, Agent, or Firm*—Barnes & Thornburg

[57] ABSTRACT

A temperature management apparatus is provided for cooling a fluid located in an interior region of a live well, the fluid being circulated by a pump. The apparatus includes a heat exchanger including a front surface, a rear surface, a first side surface, a second side surface, an inlet configured to receive fluid from the live well, and an outlet configured to return fluid to the live well. The apparatus also includes a shroud having a front wall formed to include an aperture and first and second side walls configured to be coupled to first and second sides of the heat exchanger, respectively. The apparatus further includes a fan coupled to the front wall of the shroud in communication with the aperture to increase air flow over the heat exchanger.

18 Claims, 1 Drawing Sheet

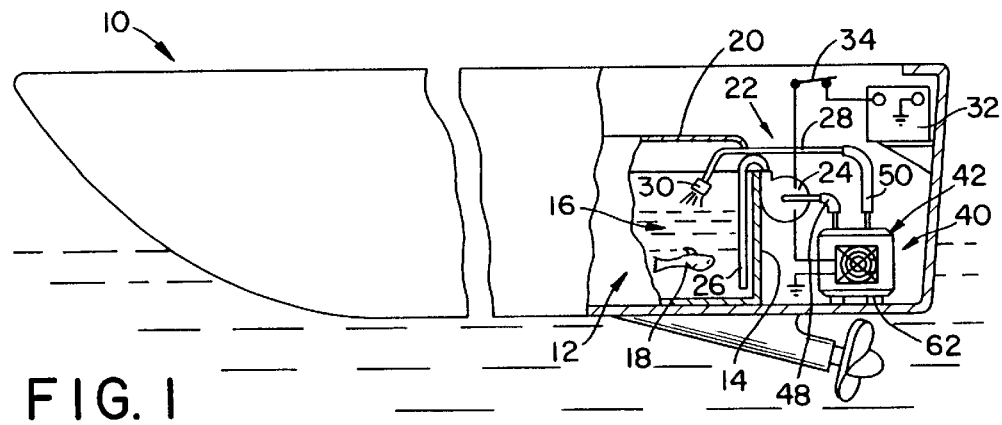
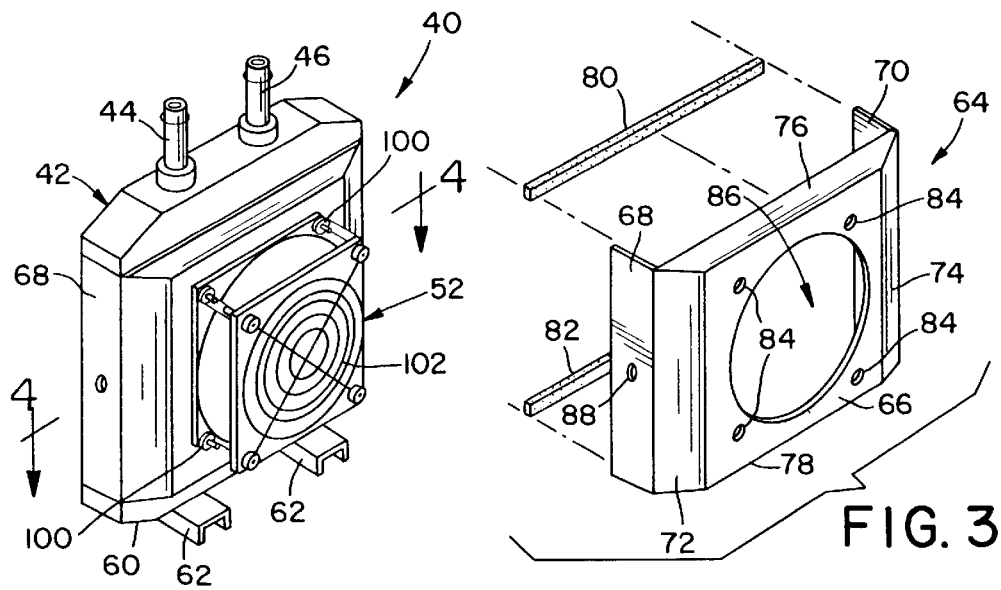
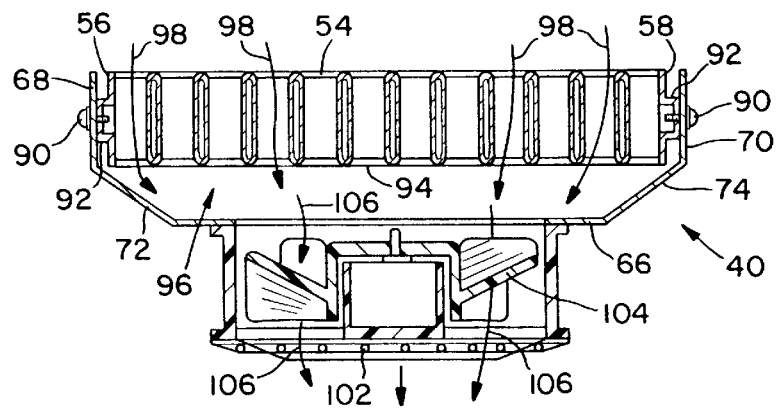

LIVE WELL TEMPERATURE MANAGEMENT APPARATUS

BACKGROUND AND SUMMARY OF THE INVENTION

The present invention relates to a temperature management apparatus for a live well on a fishing boat. More particularly, the present invention relates to an apparatus that reduces the temperature of fluid in the live well to maintain a range of fluid temperatures in the live well that more closely parallels the temperature of the natural habitat of the fish placed in the live well.

Live wells are typically used by fishermen and others to provide a method to keep alive fish that are caught and fish bait. Live wells are typically installed in boat or other watercraft but the present invention is not limited to that application. Live wells include an enclosure capable of retaining a fluid such as water and fish or other animals. See, for example, U.S. Pat. Nos. 4,033,280; 4,074,651; 5,010,836; and 5,236,175. Live wells typically include an aerator having a fluid recirculating system including a pumping device coupled to the live well enclosure and a spray nozzle device to recirculate and inject oxygen into the fluid. See, for example, U.S. Pat. Nos. 3,800,462 and 4,074,651.

Fish located in the live well are typically caught from cooler water. When the aeration system is in operation, the fish in the live well have adequate oxygen to sustain them. A problem with conventional live wells is that once the live well is filled with fluid, the temperature of the fluid will eventually reach or exceed ambient air temperature. The present invention reduces the temperature of the fluid in the live well to maintain a temperature closer to the normal habitat of the fish and reduce the likelihood of shocking the fish.

The present invention provides a temperature management system for a live well which automatically reduces temperature of the fluid in the live well to sustain fish placed therein for extended periods. The present invention allows the user to operate the apparatus effectively with no knowledge of appropriate liquid temperature required to sustain the fish. The present invention does not require the operator to select a set point for the water temperature in the live well. The present invention does not require an immersed probe in the tank or any type of refrigerant. Therefore, the operator cannot over cool the water, and a lid can be kept on the live well, if desired.

The apparatus of the present invention is designed to cool the water in the live well so that the temperature of the water is closer to the water temperature in deeper water where the fish normally reside to increase the likelihood that fish placed in the live well will survive for extended periods.

According to one aspect of the present invention, a temperature management apparatus is provided for cooling a fluid located in an interior region of a live well, the fluid being circulated by a pump. The apparatus includes a heat exchanger including a front surface, a rear surface, a first side surface, a second side surface, an inlet configured to receive fluid from the live well, and an outlet configured to return fluid to the live well. The apparatus also includes a shroud having a front wall formed to include an aperture and first and second side walls configured to be coupled to first and second sides of the heat exchanger, respectively. The apparatus further includes a fan coupled to the front wall of the shroud in communication with the aperture to increase air flow over the heat exchanger.

In the illustrated embodiment, front wall of the shroud is spaced apart from the front surface of the heat exchanger to provide an air gap between the front surface of the heat exchanger and the fan. The front wall of the shroud is connected to the first and second side walls of the shroud by first and second angled surfaces, respectively. The shroud includes a top edge and a bottom edge extending between the first and second side walls. The illustrated embodiment also includes top and bottom seals extending along the top and bottom edges of the shroud located between the shroud and the heat exchanger.

According to another aspect of the present invention, a temperature management apparatus is provided for cooling a fluid located in an interior region of a live well, the fluid being circulated by a pump. The apparatus includes a heat exchanger having an inlet configured to receive fluid from the live well and an outlet configured to return fluid to the live well. The heat exchanger is external to the interior region of the live well to provide a heat transfer to cool the fluid as fluid from the live well passes through the heat exchanger.

The illustrated embodiment includes a fan coupled to the heat exchanger to increase air flow over the heat exchanger and a shroud configured to couple the fan to the heat exchanger. The shroud is configured to extend to a perimeter edge of the heat exchanger on a front side of the heat exchanger. The illustrated shroud is made from a carbon fiber material.

Also in the illustrated embodiment, the fan is coupled to a switch for selectively turning the fan on and off. The pump is also coupled to the switch. In another embodiment, a temperature sensor is coupled to the switch. The sensor is configured to turn on the switch when the temperature of the fluid in the live well exceeds a predetermined temperature. In the illustrated embodiment, an aerator is coupled to the outlet of the heat exchanger.

According to yet another aspect of the present invention, a temperature management is provided for cooling a fluid located in an interior region of a live well, the fluid being recirculated by a circulation system. The apparatus includes means for reducing the temperature of the fluid in the live well, and means for coupling the reducing means to the circulation system of the live well.

Additional features and advantages of the invention will become apparent to those skilled in the art upon consideration of the following detailed description of the illustrated embodiment exemplifying the best mode of carrying out the invention as presently perceived.

BRIEF DESCRIPTION OF THE DRAWINGS

The detailed description particularly refers to the accompanying figures in which:

FIG. 1 is a side elevational view, with portions broken away, diagrammatically illustrating a fishing boat including a live well for holding fish, an operating apparatus, and a temperature management apparatus of the present invention;

FIG. 2 is a perspective view illustrating the temperature management apparatus of FIG. 1 which includes a heat exchanger having an inlet and an outlet to receive fluid from the live well and a fan coupled to the heat exchange to improve air movement through the heat exchanger;

FIG. 3 is an exploded view illustrating details of a shroud configured to couple to the heat exchanger; and FIG. 4 is a sectional view taken along lines 4—4 of FIG. 2 illustrating further details of the heat exchanger and fan.

DETAILED DESCRIPTION OF THE DRAWINGS

Referring now to the drawings, FIG. 1 illustrates a fishing boat 10 shown diagrammatically for illustrative purposes.

The fishing boat 10 includes a live well apparatus 12 having an outer wall 14 which defines an interior region for receiving fluid such as water 16. As fish 18 are caught, they are placed in the water 16 inside the live well 12. Live well 12 also includes a lid 20 to help maintain the fish 18 within the live well 12.

A typical live well 12 includes an aerating apparatus 22 having a pump 24 and an inlet tube 26 coupled to the pump 24 and located within the live well 12. In a typical aerating apparatus 22, the pump 24 pumps water 16 from the live well 12 through tube 26 and then through an outlet tube 28 and through aerator sprayer 30 back into the live well 12. Aerating apparatus 22 therefore adds oxygen back into the fluid 16 to sustain the fish 18. Pump 24 is coupled to a battery 32 and turned on and off by switch 34.

A problem associated with live wells is that the temperature of the water 16 in the live well 12 begins to increase after the water 16 is placed in the live well 12. Therefore, when the live well 12 is initially filled with lake water, the temperature may be close to the water temperature of the natural environment in which the fish reside. Over time, however, the temperature of the water 16 increases. Live well temperatures are therefore often substantially higher than the water temperature of the natural habitat in which the fish reside.

The present invention provides a temperature management apparatus 40 for cooling the temperature of the water 16 in the live well 12. The temperature management apparatus 40 includes a heat exchanger 42 having an inlet tube 44 and an outlet tube 46. The inlet tube 44 is configured to be coupled to an outlet of pump 24 by tube 48. Outlet 46 is configured to be coupled to pipe 28 and aerator 30 by tube 50. A fan 52 is coupled to heat exchanger 42. The fan 52 is also coupled to battery 32. The fan 52 may be coupled directly to the battery 32 by a separate switch. The fan 52 may also be coupled to the same switch 34 as the pump 24 so that any time the pump 24 is turned on to circulate the fluid 16, the fan 52 is also turned on to increase air movement through the heat exchanger 42.

Temperature management apparatus 40 is best illustrated in FIGS. 2–4. The heat exchanger 42 is illustratively a radiator or heater core 54 having internal passageways and openings to permit air flow through the heat exchanger 42. The heat exchanger 42 includes spaced apart side walls 56 and 58 and a bottom surface 60. Feet 62 are illustratively coupled to the bottom surface 60 to help hold the heat exchanger 42 upright.

The fan 52 is coupled to the heat exchanger 42 by a shroud 64 best illustrated in FIG. 3. Illustratively, shroud 64 is formed from a carbon fiber material which is molded into the appropriate shape. It is understood that other types of material such as a molded plastic material or stamped metal material may be used for the shroud 64. Shroud 64 includes a front wall 66, spaced apart side walls 68 and 70, and angled sections 72 and 74 which extend between the front wall 66 and the side walls 68 and 70, respectively. Top and bottom edges 76 and 78 are also angled as shown. Top and bottom gaskets 80 and 82 are located between the shroud 64 and the heat exchanger 42 along top and bottom edges 76 and 78, respectively. Gaskets 80 and 82 may have an adhesive coating.

Front wall 66 of shroud 64 is formed to include mounting apertures 84 and a central aperture 86 sized to receive the fan 52. Side walls 68 and 70 are also formed to include mounting apertures 88. Shroud 64 is coupled to heat exchanger 42 by fasteners 90 which extend through apertures 88 in side walls 68 and 70 and into mounting portions 92 formed on opposite sides 56 and 58 of heat exchanger 42. Front wall 66 of shroud 64 is spaced apart from a front surface 94 of heat exchanger 42 to define an interior region or gap 96 as shown in FIG. 4. Therefore, the fan 52 is spaced apart from the front surface 94 of heat exchanger 42.

Pump 24 causes the water 16 to pass through heat exchanger 42. Air circulates through heat exchanger 42 as illustrated by arrows 98 to cool the water 16 passing through the heat exchanger 42. Fan 52 increases air flow through the heat exchanger 42 to improve heat transfer from the water 16 to the air.

Fan 52 is mounted to the front surface 66 by fasteners 100 extending through apertures 84. Fan 52 includes a front grate 102 and an interior blade 104 configured to draw air through the heat exchanger 42 as shown by arrows 106 and 98.

Heat exchanger 42 is illustratively made of aluminum for fresh water live wells and from brass for salt water live wells, although other types of material may be used. Fan 52 is illustratively a 12 volt fan available from Sunon. Heat exchanger 42 can have a different size or capacity depending upon the size of live well. For an 8–10 gallon live well 12, a heat exchanger 42 having a capacity of about 1.5 quarts is sufficient. It is understood that larger or smaller capacity heat exchangers 42 may be used depending upon the temperature drop desired.

Temperature management apparatus 40 provides a 5–8 degree drop of the temperature of water 16 in a live well 12. Therefore, the temperature of the water is closer to the temperature of the water in the natural habitat in which the fish reside.

It is understood that the temperature management apparatus 40 does not have to be used with an aerating apparatus 22. A separate pump may be provided solely for the temperature management apparatus 40. However, since most live wells 12 already include an aerating apparatus 22 having a pump 24, it is convenient to mount the temperature management apparatus 40 in line with the existing aerating apparatus 22. The temperature management apparatus 40 may be mounted anywhere on the fishing boat 10 but it is preferably mounted below a main deck of the boat where temperatures are often cooler. The temperature management apparatus 40 may be used in connection with a temperature sensor (not shown). However, the illustrated embodiment runs the fan 52 any time the aerating apparatus 22 is in operation to cool the water 16.

Although the invention has been described in detail with reference to a certain illustrated embodiment, variations and modifications exist within the scope and spirit of the present invention as defined in the following claims.

What is claimed is:

1. A temperature management apparatus for cooling a fluid located in an interior region of a live well, the fluid being circulated by a pump, the apparatus comprising:
   a heat exchanger including a front surface, a rear surface, a first side surface, a second side surface, an inlet configured to receive fluid from the live well, and an outlet configured to return fluid to the live well;
   a shroud having a front wall formed to include an aperture and first and second side walls configured to be coupled to first and second sides of the heat exchanger, respectively; and
   a fan coupled to the front wall of the shroud in communication with the aperture to increase air flow over the heat exchanger.

2. The apparatus of claim 1, wherein the heat exchanger is external to the interior region of the live well and provides a liquid to air heat transfer as fluid from the live well passes through the heat exchanger.

3. The apparatus of claim 1, further comprising at least one foot coupled to a bottom surface of the heat exchanger.

4. The apparatus of claim 1, wherein the shroud is made from a carbon fiber material.

5. The apparatus of claim 1, wherein the front wall of the shroud is spaced apart from the front surface of the heat exchanger to provide an air gap between the front surface of the heat exchanger and the fan.

6. The apparatus of claim 1, wherein the front wall of the shroud is connected to the first and second side walls of the shroud by first and second angled surfaces, respectively.

7. The apparatus of claim 1, wherein the shroud includes a top edge and a bottom edge extending between the first and second side walls, and further comprising top and bottom seals extending along the top and bottom edges of the shroud located between the shroud and the heat exchanger.

8. The apparatus of claim 1, further comprising an aerator coupled to the outlet of the heat exchanger.

9. A temperature management apparatus for cooling a fluid located in an interior region of a live well, the fluid being circulated by a pump, the apparatus comprising a heat exchanger including an inlet configured to receive fluid from the live well and an outlet configured to return fluid to the live well, the heat exchanger being external to the interior region of the live well to provide a heat transfer to cool the fluid as fluid from the live well passes through the heat exchanger and further comprising a fan coupled to the heat exchanger to increase air flow over the heat exchanger.

10. The apparatus of claim 9, further comprising a shroud configured to couple the fan to the heat exchanger, the shroud being configured to extend to a perimeter edge of the heat exchanger on a front side of the heat exchanger.

11. The apparatus of claim 10, wherein the shroud is made from a carbon fiber material.

12. The apparatus of claim 10, wherein the shroud includes a front wall formed to include an aperture for receiving the fan and first and second side walls configured to be coupled to first and second sides of the heat exchanger, the fan being coupled to the front wall of the shroud.

13. The apparatus of claim 12, wherein the front wall of the shroud is spaced apart from a front surface of the heat exchanger to provide an air gap between the front surface of the heat exchanger and the fan.

14. The apparatus of claim 9, wherein the fan is coupled to a switch for selectively turning the fan on and off.

15. The apparatus of claim 14, wherein the pump is also coupled to the switch.

16. The apparatus of claim 14, further comprising a temperature sensor coupled to the switch, the sensor being configured to turn on the switch when the temperature of the fluid in the live well exceeds a predetermined temperature.

17. The apparatus of claim 9 wherein the heat exchanger is made from a metal material.

18. The apparatus of claim 9 further comprising an aerator coupled to the outlet of the heat exchanger.

\* \* \* \* \*